United States Patent [19]
Yeung

[11] Patent Number: 5,712,787
[45] Date of Patent: Jan. 27, 1998

[54] ELECTRONIC POSTAL COUNTER

[75] Inventor: Yukee Yeung, Baie D'Urfe, Canada

[73] Assignee: Canada Post Corporation, Ottawa, Canada

[21] Appl. No.: 500,090

[22] Filed: Jul. 10, 1995

[51] Int. Cl.⁶ .................................................. G06F 19/00
[52] U.S. Cl. ........................ 364/478.09; 364/464.18; 364/464.21; 364/478.15
[58] Field of Search ................. 364/478.07, 478.09, 364/478.14, 478.15, 401, 403, 464.02, 464.03, 464.11, 464.16, 464.18, 464.15, 464.21; 395/210, 216, 217, 218

[56] References Cited

U.S. PATENT DOCUMENTS

| | | | |
|---|---|---|---|
| 4,725,718 | 2/1988 | Sansone et al. | 235/495 |
| 4,760,532 | 7/1988 | Sansone et al. | 364/464 |
| 4,962,454 | 10/1990 | Sansone et al. | 364/464.02 |
| 4,998,204 | 3/1991 | Sansone et al. | 364/464.02 |
| 4,999,481 | 3/1991 | Baer et al. | 364/464.02 |
| 5,001,648 | 3/1991 | Baker | 364/464.03 |
| 5,025,386 | 6/1991 | Pusic | 364/466 |
| 5,050,078 | 9/1991 | Sansone | 364/464.03 |
| 5,060,165 | 10/1991 | Schumacher et al. | 364/478.01 |
| 5,065,000 | 11/1991 | Pusic | 364/464.03 |
| 5,068,797 | 11/1991 | Sansone et al. | 364/478.07 |
| 5,072,401 | 12/1991 | Sansone et al. | 364/478.07 |
| 5,077,694 | 12/1991 | Sansone et al. | 364/464.02 X |
| 5,079,714 | 1/1992 | Manduley et al. | 364/478.07 |
| 5,173,862 | 12/1992 | Fedirchuk et al. | 364/464.02 |
| 5,202,834 | 4/1993 | Gilham | 364/464.02 |
| 5,313,404 | 5/1994 | Wu | 364/464.03 |
| 5,319,562 | 6/1994 | Whitehouse | 364/464.03 |
| 5,323,323 | 6/1994 | Gilham | 364/464.02 |
| 5,324,893 | 6/1994 | Manduley et al. | 364/464.03 |
| 5,326,181 | 7/1994 | Eisner et al. | 364/464.02 |
| 5,420,403 | 5/1995 | Allum et al. | 235/375 |
| 5,469,362 | 11/1995 | Hunt et al. | 364/478.01 |

Primary Examiner—Joseph Ruggiero
Attorney, Agent, or Firm—Wenderoth, Lind & Ponack

[57] ABSTRACT

A postal service purchasing system involves the mailer entering information, such as delivery address, weight of mail piece, services required, about each mail piece using for example a personal computer. Electronic postal counter software installed at the mailer's premises causes the information entered to generate a barcode identifier for each mail piece and this barcode identifier is printed on the mail piece. An electronic manifest containing the identifier for the mail pieces is transmitted to a computer at the Post Office Premises. As each mail piece is subsequently sorted the identifier information is captured and reconciled with the information on the electronic manifest.

11 Claims, 2 Drawing Sheets

One-Step Addressing & Barcoding

Process Schematic

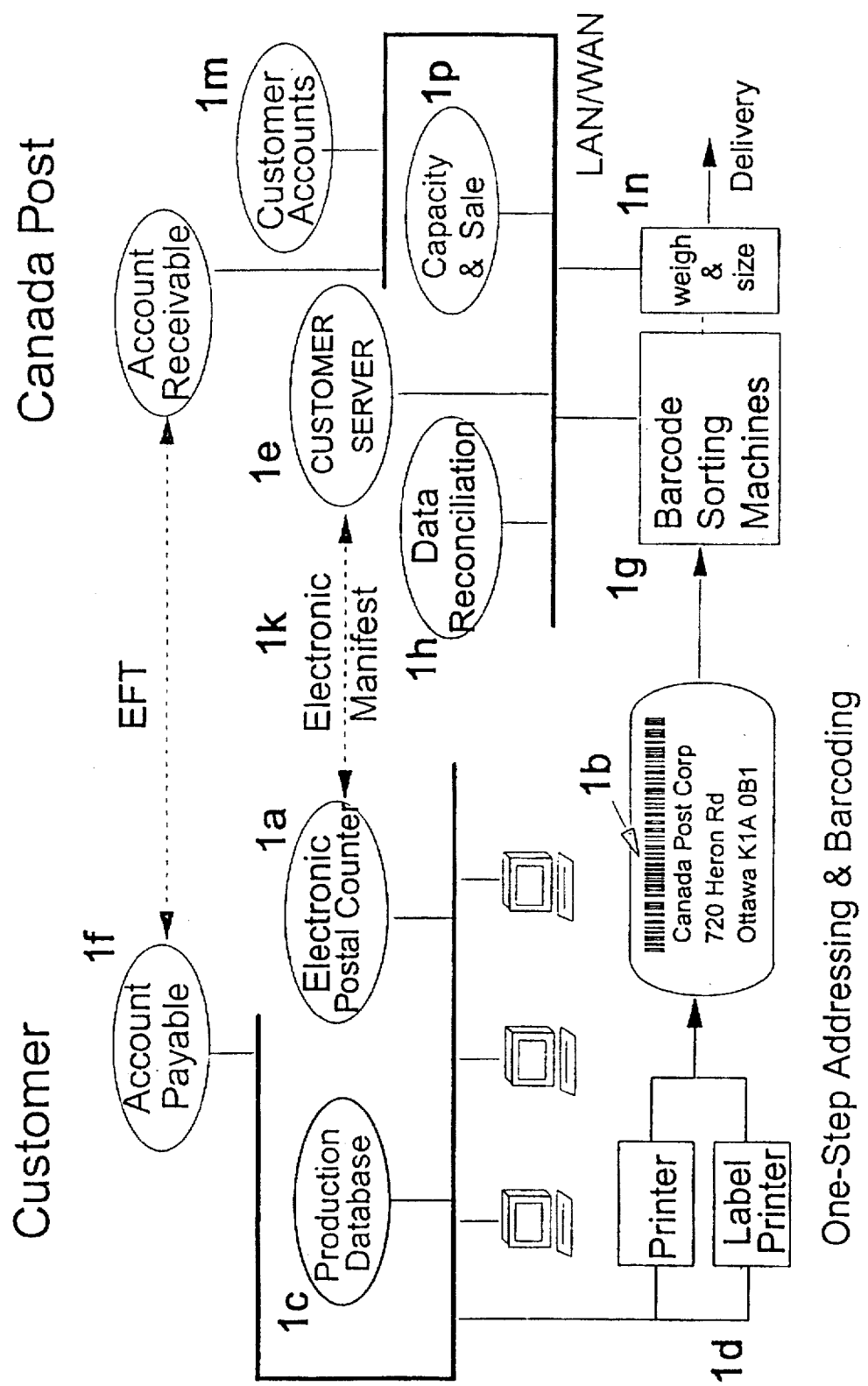
Figure 1 Process Schematic

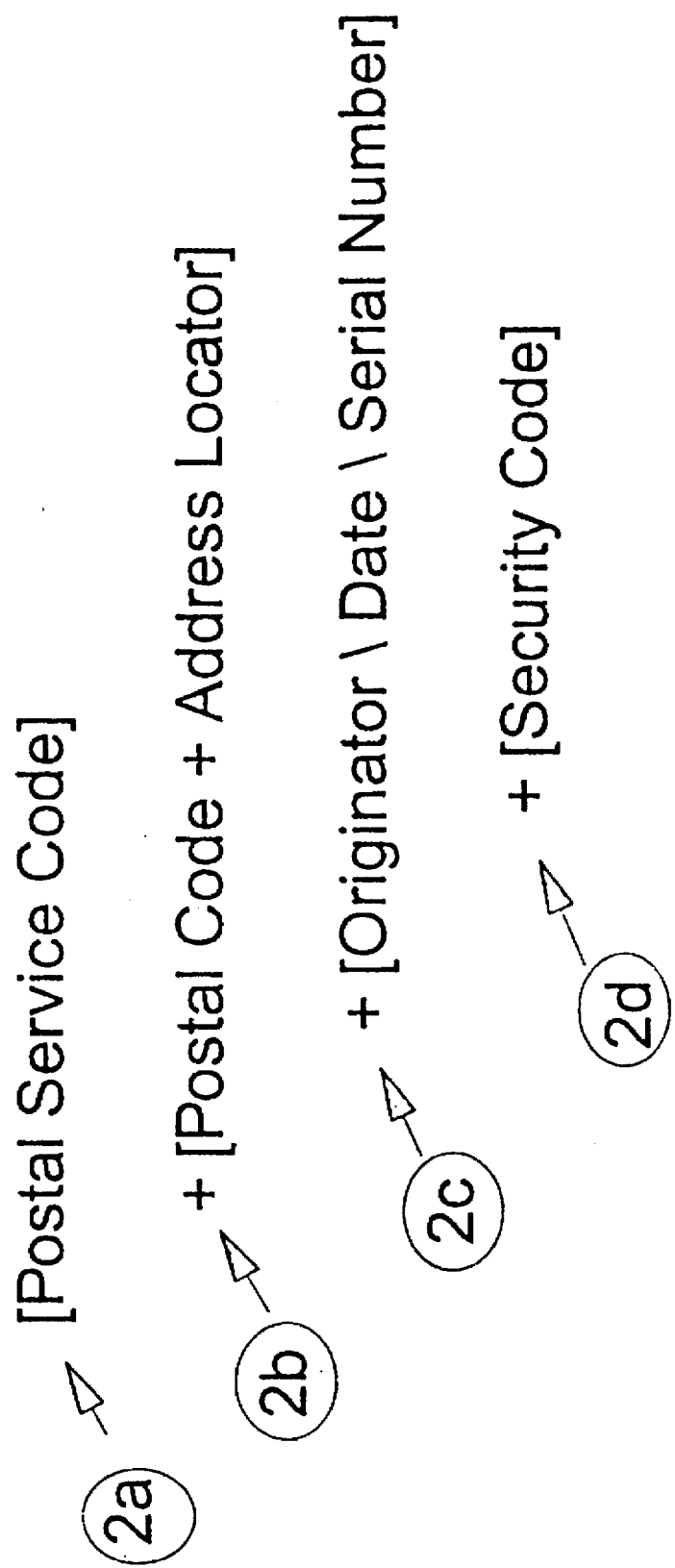
Figure 2 - Data Contents in Barcode Identifier on Mail

ELECTRONIC POSTAL COUNTER

BACKGROUND OF THE INVENTION

The present invention relates to apparatus which permits mailers to purchase the products and services of the Post Office in a secured system without the need to affix any conventional physical postage such as a meter impression or a stamp on a mail item.

As is known, postage is required on a mail item before it can be posted. Presently the postage takes the form of either a stamp, an approved meter impression showing the postage value and the meter registration number, or a preprinted permit number in the case of contracted mailers. They are "postal currency" used as payment as well as the proof-of-payment for postal services. With the exception of Permit Mail, meter impression and stamp are usually affixed at the piece level as a last step in the mailing process when the mail item is packaged, addressed and rated. When the postage inventory is exhausted, the customer also needs to replenish the stamps or refill the meter. This age old mailing process is not cost productive and does not create any value as far as the customer is concerned. They are being done for the postal administration only.

In the case of Permit Mail which has the permit number generally printed on the mail item, a Statement of Mailing (SOM) is usually required to accompany the physical mail to indicate rating parameters such as quantities, services and dimensions. In the case of Canada Post Corporation (CPC) for whom the invention was particularly developed, CPC subsequently captures back the SOM data, mostly through keyboard entry, and invoices or debits the customer's account. Significant infrastructure costs and operating costs are incurred by both CPC and its customers to make stamps, rent meters, determine and apply postage onto the mail items, and cancel the postage. Because stamps and meters have cash trading values, they also create many security problems. The authenticity of the graphic meter impressions and stamps are difficult to verify on high speed mail processing machines; stamps and meters are liable to be stolen; the postage images can be easily reproduced from other printing sources; and the procurement of the postal "currency" is continuously an issue of concern for security and cost.

Another disadvantage of conventional postage application is that postage value is predetermined at the front end. This does not support a flexible pricing structure in which the processing requirements and therefore its postage is only determined when the mail item is processed and/or delivered to the end receiver.

SUMMARY OF THE INVENTION

The invention is a new process and new apparatus designed to replace the current postage application methods and allow CPC to determine and verify postage on automated processing lines.

In the new process, Electronic Postal Counter (EPC) software installed-on the mailer's computer environment generates an address which includes a barcode identifier.

The Post Office uses this barcode to determine factors such as required services and billing information. The actual cost is optimized and determined after the delivery, and verification of services performed allowing for a much more flexible pricing structure than that currently available. The invention eliminates the need for the user to replenish postage supplies and eliminates possible security problems with meter impression or stamp postage.

BRIEF DESCRIPTION OF THE DRAWINGS

In drawings which illustrate embodiments of the invention:

FIG. 1 is a process schematic illustrating the new process concept and the apparatus used; and FIG. 2 illustrates the data contents of barcode identifier on mail.

DESCRIPTION OF THE PREFERRED EMBODIMENT

On the customer side, there is an Electronic Postal Counter (EPC) application software 1a installed in the mailer's computing environment. The conventional graphic postage is eliminated. Instead, the delivery address block on the mail item will include a barcode identifier 1b assigned by the EPC. The barcode identifier 1b is printed out together with the delivery address. Unlike stamp or meter impression, the barcode identifier 1b contains generic data elements. It does not describe the postage value and it has no cash trading value.

FIG. 2 illustrates the generic application data elements in the barcode 1b. Item 2a shows a CPC Service Code that identifies the postal services the customer is buying and is tied to the postal rates charged by CPC for performing the services such as Track and Trace mail, Certified, Registered, Security Registered, etc.; Item 2b shows the exact point-of-delivery indicator using CPC Postal Code and a derivative of the address; Item 2c shows the [Originator\Date\Serial Number] data elements that uniquely identify the mail piece and where it is coming from; and Item 2d shows a Security Code that functions as an admission password in the automated mail process. The Security Code 2d is derived from an encrypted message of [Originator, Date and User Password] using a third party encryption algorithm. It changes daily as the data elements in the message change. Reference should be made to U.S. Pat. No. 5,420,403 issued on May 30, 1995 and assigned to Canada Post Corporation and to U.S. application Ser. No. 08/331,955 filed Oct. 31, 1994, now U.S. Pat. No. 5,602,382, also assigned to Canada Post Corporation for further information on specific fields such as the Postal Code and Address Locator serving as a point of delivery indicator. This patent and application are incorporated herein by reference.

The EPC 1a is capable of accepting data from the mailer's mail production (printing and packaging) database 1c to extract rating information such as packaging dimensions, weight of contents, recipient names, delivery addresses, recipient account files and delivery service requirements such as scheduled delivery times, recipient signature, collection on delivery, etc. The mail production database 1c could be a single day batch, or a series of day batches over a planned production period. Upon accepting the rate data directly from the mail production database 1c, the EPC 1a can, as a value-added option to selected customers, pass along the information to CPC Customer Server 1e to acquire discount consideration. CPC Customer Server 1e integrates the mailer's preliminary production plan with CPC rate structure, incentive or promotional discounts, and capacity profiles pulled from CPC production capacity and sale databases 1p. Algorithms are used to generate an optimal mail production plan based on volumetric consolidation, packaging and containerization options, drop off times or pick up times, mail preparations, and printing or assembling sequence to presort the mail. If the optimal production plan is accepted by the mailer, the EPC 1a is capable of sending the modified data back to be integrated with the mailer's production database 1c. In doing so, the EPC 1a also generates the data contents for the barcode identifier 1b as shown in FIG. 2 for every individual mail item. The data contents of the barcode identifier 1b are subsequently merged with the address printing file as an additional data field. The printing formats of the addresses, including the barcode identifiers, are also created for the address printer 1d in the mail production system. The EPC 1a keeps track of the mailing statistics and the information is retrievable at anytime through an authorized command. Included in the batching statistics are the unique identifiers, rate factors, dates and times, account numbers, mailing costs and other relevant information.

Besides integration with production database, the EPC 1a also supports keyboard posting of mail items by individual senders. Upon opening the EPC applications on a stand-alone PC or a group of PCs in a LAN environment, a CPC service menu is displayed. The user is prompted to enter information about the mail item and the postal services selected. The information can be declared both at the piece level or at the batch level if there are more than one physically identical items. When the declaration is completed, the EPC 1a stores the information and automatically assigns a barcode identifier 1b to every mail item. The identifier data and its barcode printing instructions are transmitted and merged with the address printing file when the delivery address is printed out by the user's desk top printer 1d.

All transactions posted at the EPC 1a, including the assigned unique data identifiers, are registered in a central transaction manifest maintained by the EPC 1a. Unless the transactions are cancelled by the mailer through an authorized retrieval process, the EPC 1a automatically creates an electronic manifest 1k to the CPC Customer Server 1e in EDI format. The electronic manifest 1k header contains the [Originator, Date 2c, and Security Code 2d] data elements as encoded in the barcode identifiers. If there is any change in the User Password or change in the encryption key used by the customer to generate the Security Code 2d, the new information is also transmitted to the CPC Customer Server 1e in a secure manner using established security measure in EDI transmission. CPC Customer Server 1e automatically authenticates the transmission source and verifies the Security Code 2d from its registered customer database 1m every time a manifest is received. In addition, the manifest 1k also contains mailing information that includes: the Serial Numbers or range of Serial Numbers 2c used by the EPC 1a to identify every mail item in association with the postal services and rating information declared by the mailer; postal rate discount conditions based on collection, shipping or mail preparation; additional processing requirements, and other relevant financial information related to payment. The manifest 1k is sent by the user from a work station, and the event is also self-prompted whenever outstanding valid mail transactions are detected at defined time periods. All records are retrievable locally at the EPC 1a or through a dial-in inquiry to CPC Customer Server 1e.

The EPC is also capable of integrating with the mailer's financial applications if to support direct electronic fund transfer. The EPC 1a supports various kinds of commercial payment methods that CPC may offer to individual customers, including debit account with CPC, commercial credit cards, direct payment, payment by cheque, monthly billing and pay-per-use billing for quantity mailing. All debit accounts are held in CPC computing environment accessible through CPC Customer Server 1e. There is no lump-sum value stored at and debited from the EPC 1a. During the posting process, the EPC 1a prompts the user to select a payment method and provide information related to the choice of payment. A credit check on the selected choice of payment is done on line by the EPC 1a or by CPC Customer Server 1e. The completion of the posting process at the CPC 1a is conditional on acceptable financial status. If the mailer has unacceptable financial status, the EPC 1a will not close the transaction, assign unique data identifiers to the mail items or manifest electronically to the CPC Customer Server 1e. To avoid unnecessary credit verification for every individual posting, the EPC 1a provides CPC options to customize the needs for individual customers. These options including waiving the credit check process based on individual or accumulated dollar value of mail transactions, expiring date in the case of debit account and invoicing account, and batching the fund processing based on accumulated dollar value in the case of direct payment and payment by commercial credit cards.

When the mail enters into CPC's process, the data elements in the barcode identifier 1b are captured by CPC Barcode Sorting Machine 1g. The physical characteristics of the mail items related to postage rating, such as sizes and weight of parcels, may also be measured on-line by automated sizing and weighing devices in installed on the sorting equipment. The level to which postage verification is done is determined by the values of the postal products in question. Premium mail items are verified at 100% assurance. Low valued products are verified according to statistical tolerances and special control needs on a case basis.

FIG. 1 also illustrates a generic data reconciliation application 1h in CPC computing environment. In addition to off-line data processing, the application 1h may also functionally reside at the processing equipment level such as parcel sorting conveyors for on-line reconciliation in real time. The application 1h compares the data captured from the barcode identifiers 1b and any line measurements associated with the mail items against the information in the electronic manifest 1m. First level data reconciliation is fully automated and is done on-line in real time and off-line in near real time, depending on the postal products and the mail sorting equipment. The reconciliation application 1h counts and admits identifiers that bear the correct data elements in a hierarchy of [Originator\Date 2c\Security Code 2d]. Second level verification is done at the piece level using the Serial Number 2d and other data elements in the identifier and line measurements on weight and sizes against the electronic manifest 1m. Exceptions and deviations are reported and statistically monitored. Using the unique barcode identifier 1b, suspect mail items can be singled out from automated processing lines for higher level manual verification. The data reconciliation functions as the admission process for the mail transactions. It verifies the admission conditions based on which postage is determined, and it verifies that value-added services requested by the mailer are performed.

Fund adjustments are automatically made through the same payment method selected by the mailer. An adjustment notice is sent back by CPC Customer Server 1e to the mailer's EPC 1a stipulating the changes and reasons for the changes. If the mailer disputes the adjustments, the dispute is handled through a separate settlement process with a CPC customer representative.

The EPC 1a also provides a common access to electronic communication between CPC and its customers. It supports other applications which include product information, rate structures, mailing statistics, cost tracking, cost analysis, electronic messages, billing and payment, and any services that CPC may offer via this channel.

What is claimed is:

1. A computer system for purchasing services without the use of postage stamps or meters from a postal administration for the delivery by the postal administration of mail pieces, comprising means at a mailer's premises for entering data by a mailer relating to the mail pieces including for each mail piece address information and type of service required, means for displaying an estimate of the cost of mailing each mail piece, means for the mailer to enter a method of payment and provide information related to the choice of payment, means for determining whether or not to accept the method of payment, means dependent on acceptance of the method of payment for creating a unique identifier for each mail piece based on the data entered by the mailer, means for printing the identifier in a coded format directly onto the mail piece or onto an address label for the mail piece, and means for transmitting to the postal administration premises an electronic manifest containing the data entered for each mail piece.

2. Apparatus according to claim 1, including means for generation of and for displaying to the mailer an optimal mailing plan, dependent upon postal rates and other discount factors offered by the postal administration.

3. Apparatus according to claim 1, in which the identifier is printed in barcode format together with the delivery address.

4. Apparatus according to claim 1, including mail processing equipment on the postal administration premises to capture the unique identifier and other physical information on the mail pieces, verify postage, and process the mail pieces accordingly.

5. Apparatus according to claim 4, including means at the postal administration premises for reconciling the captured information including identifiers against the electronic manifest.

6. Apparatus according to claim 5, including a recovery system for acting on exceptions from the reconciliation process to intervene in the normal processing of the affected mail pieces.

7. Apparatus according to claim 6, including means at the postal administration premises for electronically remitting back to the mailer deviations from the reconciliation process, process confirmation and postage adjustments.

8. Apparatus according to claim 1, including means for deriving a security code for a mailer and including the security code in the identifier, the electronic manifest including the security code.

9. Apparatus according to claim 8, in which the identifier comprises, in addition to a security code and information relating to address and type of service required, information relating to the mailer, the date and mail piece serial number all of which is included on the electronic manifest.

10. Apparatus according to claim 9 in which the identifier is printed in barcode format.

11. Apparatus according to claim 10 including mail processing equipment at the postal administration premises for capturing the unique identifier and for capturing weight and size information of the mail pieces and for processing the mail pieces accordingly.

* * * * *